March 25, 1947. G. J. WAYLAND 2,417,894
ROTARY DIESEL ENGINE
Filed Sept. 23, 1943 5 Sheets-Sheet 1

Glenn J. Wayland,
INVENTOR.

BY
Victor J. Evans & Co.
ATTORNEYS

March 25, 1947.  G. J. WAYLAND  2,417,894
ROTARY DIESEL ENGINE
Filed Sept. 23, 1943  5 Sheets-Sheet 4
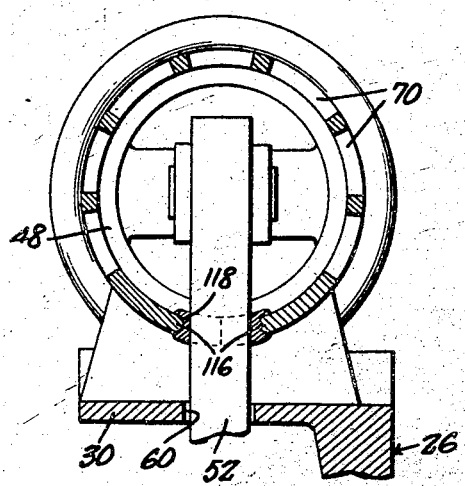
Fig. 4.
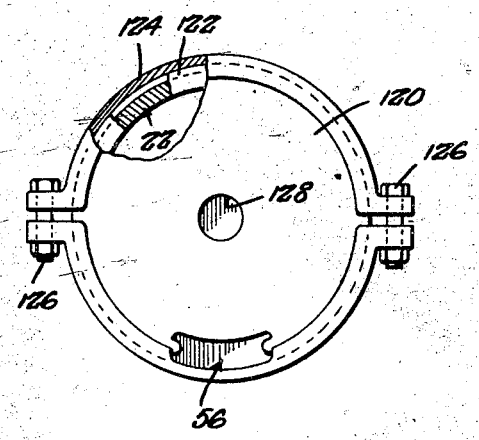
Fig. 5.
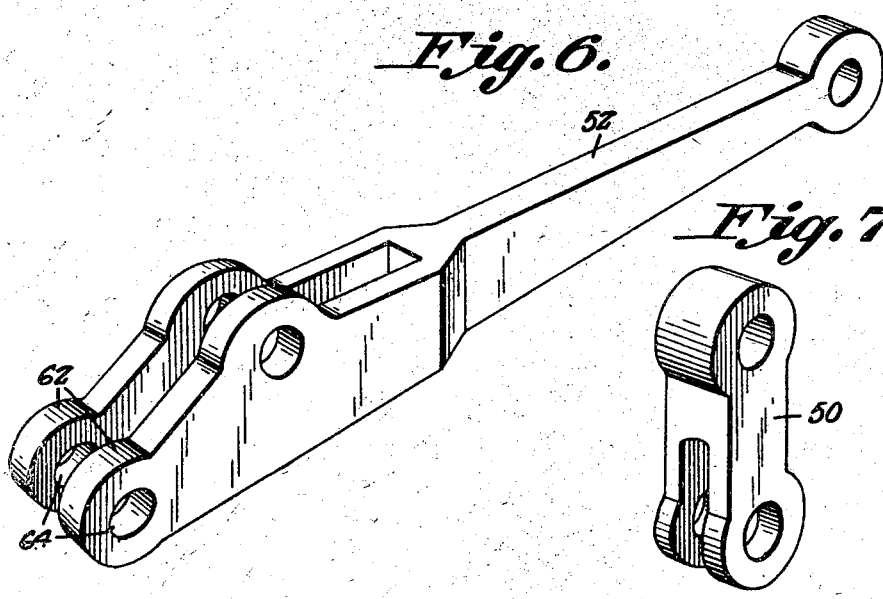
Fig. 6.
Fig. 7.
Glenn J. Wayland,
INVENTOR.
BY
Victor J. Evans & Co.
ATTORNEYS March 25, 1947.                G. J. WAYLAND                2,417,894
                              ROTARY DIESEL ENGINE
                         Filed Sept. 23, 1943          5 Sheets-Sheet 5
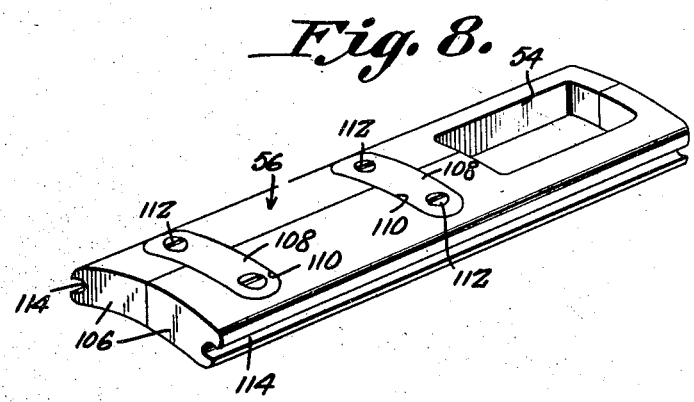
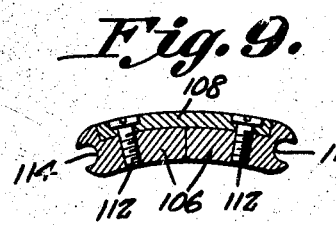
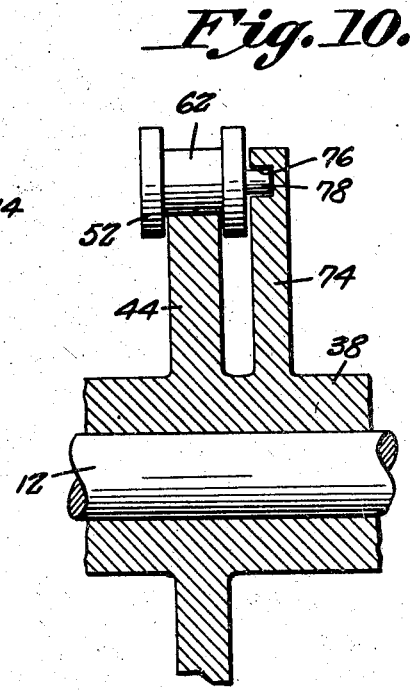
Glenn J. Wayland,
INVENTOR.
BY
ATTORNEYS Patented Mar. 25, 1947

2,417,894

UNITED STATES PATENT OFFICE 2,417,894

ROTARY DIESEL ENGINE

Glenn J. Wayland, Ottumwa, Iowa

Application September 23, 1943, Serial No. 503,557

1 Claim. (Cl. 123—43)

My invention relates to internal combustion engines, and has among its objects and advantages the provision of an improved engine of the Diesel type operating on the two-cycle principle and embodying a novel rotary engine structure rotated through the medium of rocket power impulses incident to the exhausting gases and direct power impulses from the pistons.

In the accompanying drawings:

Figure 4 is a sectional view taken along the line 4—4 of Figure 2;

Figure 5 is an end view of one of the cylinders with a portion broken away;

Figure 6 is a perspective view of one of the power levers for connection with a piston of the engine;

Figure 7 is a perspective view of a link connecting one end of the lever of Figure 6 with its piston;

Figure 8 is a perspective view of a slide through which the arm of Figure 6 extends to a position inside its respective cylinder;

Figure 9 is a transverse sectional view of the slide of Figure 8; and

Figure 10 is a sectional detail view of a cam structure coacting with a group of arms of the type illustrated in Figure 6.

Figure 1:
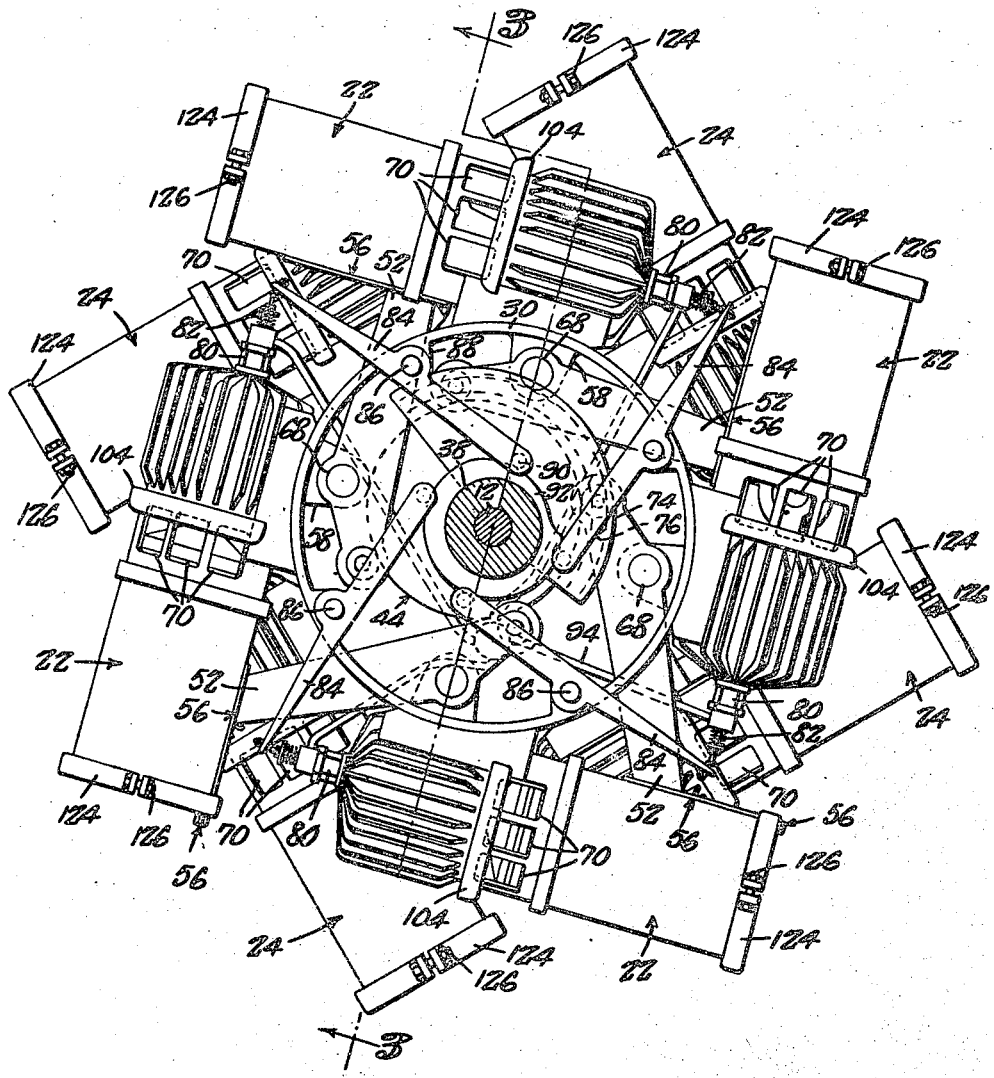
Figure 1 is an end view of an engine in accordance with my invention.
Figure 3:
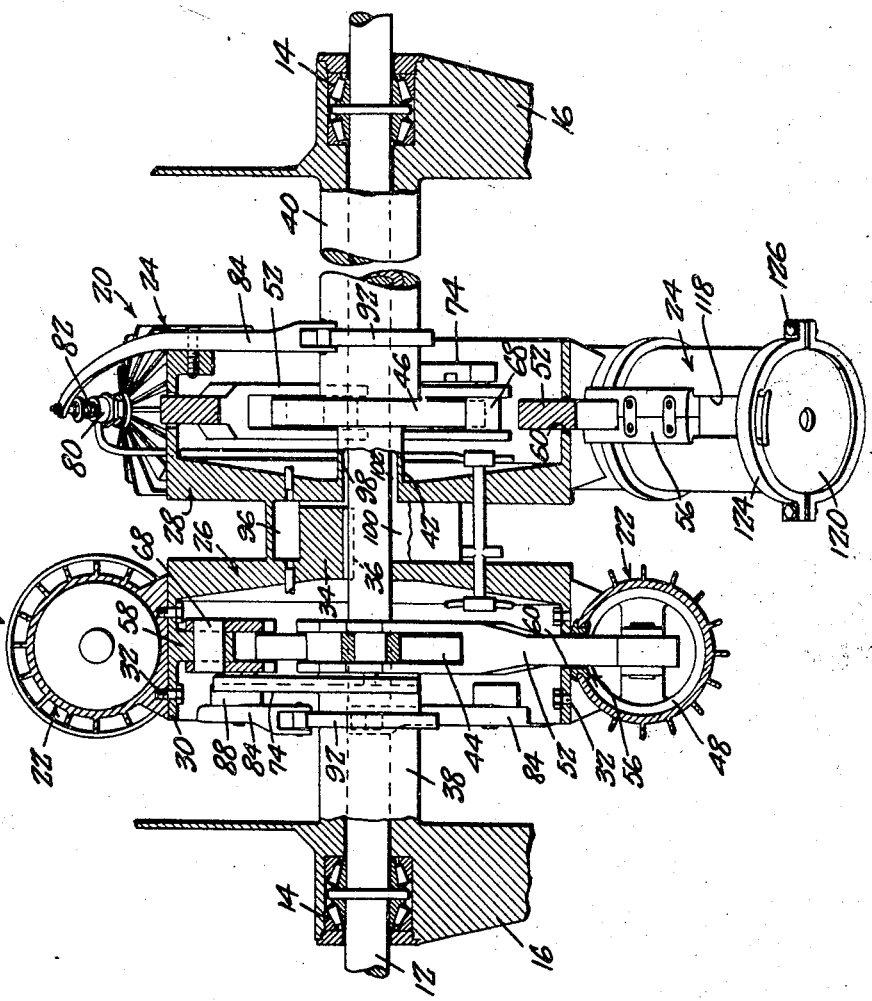
Figure 3 is a sectional view taken along the line 3—3 of Figure 1.

In the embodiment selected for illustration, Figure 3 illustrates the engine shaft at 12 as being rotatably supported in bearings 14 mounted in engine supports 16. The engine comprises two banks 18 and 20 of cylinders 22 and 24. Figure 3 illustrates the banks 18 and 20 as being spaced axially of the shaft 12, while Figure 1 illustrates the cylinders 18 grouped in the outline of a square with the cylinders arranged with their axes at an angle of ninety degrees one with the other. However, two diagonally opposite cylinders are arranged with their axes in parallelism. The cylinders 24 are arranged in the same manner with the exception that the group is offset forty-five degrees with respect to the cylinders 22. Thus the axes of the cylinders 22 and 24, when viewed according to Figure 1, are angled at forty-five degrees one with the other when viewed by cylinder in either a counter- or clockwise direction.

Cylinder-carrying bodies 26 and 28 respectively support the cylinder banks 18 and 20. These bodies are in the nature of flanges arranged at right angles to the axis of the shaft 12 and each includes an annular flange 30 to which their respective cylinders are attached, as by bolts 32. The two bodies 26 and 28 are connected as a unit by a body 34 through which the shaft 12 extends and is keyed thereto, as at 36. Tubular extensions 38 and 40 are respectively secured to the engine supports 16. The shaft 12 extends loosely through the tubular extension 38 and a sleeve 42 on the body 28 extends loosely through the greater length of the tubular extension 40, with the sleeve 42 fitting snugly on the shaft 12 and the latter extending loosely through the remaining extent of the extension 40.

To the extension 38 is fixedly secured an eccentric flange 44 and a similar flange 46 is attached to the tubular extension 40. Figure 3 illustrates the eccentric flange 44 as lying within the annular flange 30 of the body 26 and the eccentric flange 46 as lying within the annular flange 30 of the body 28. Since the two cylinder banks 18 and 20 are identical in construction and operation, the description of either bank structure will apply to both.

Figure 2:
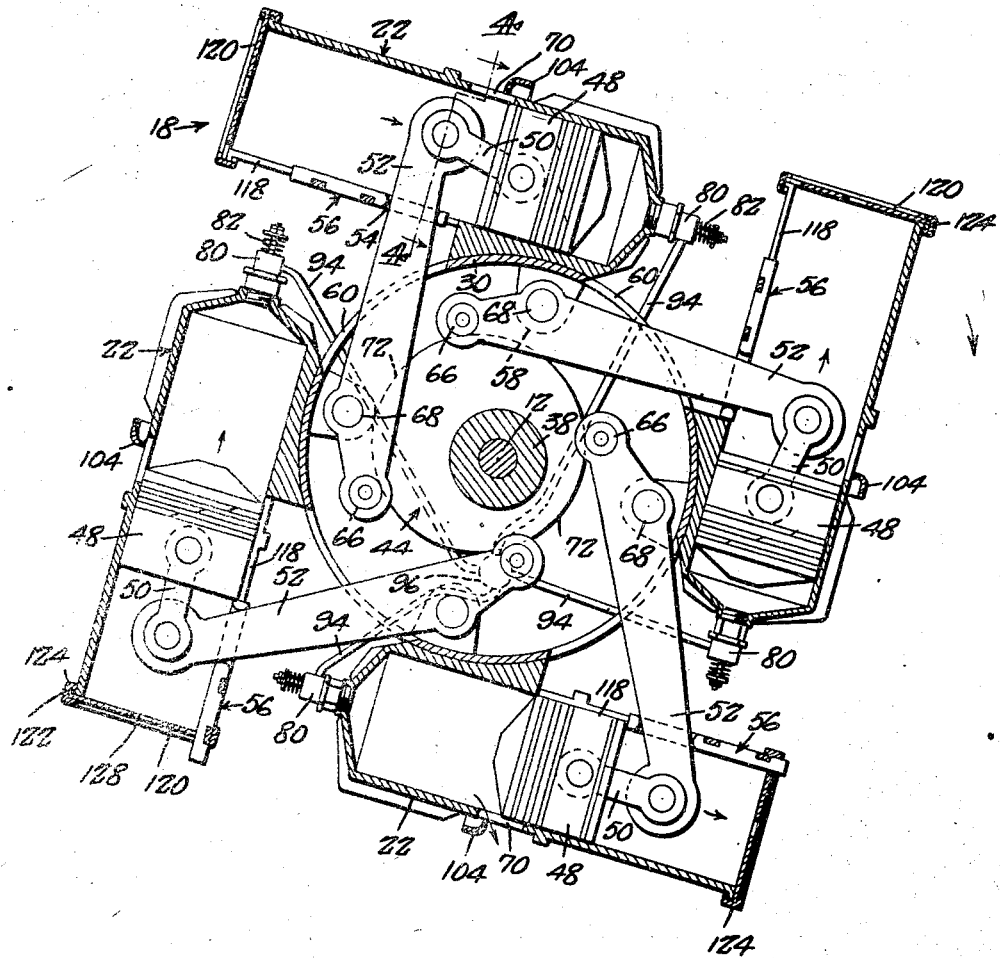
Figure 2 is a sectional view through one bank of cylinders.

Referring to Figure 2, each cylinder 22 is provided with a slidable piston 48 having one end of a link 50 pivotally connected therewith and the other end of the link pivotally connected with a power lever 52 extending through an opening 54 in a slide 56 movable longitudinally of the cylinder. The power levers 52 are pivotally connected intermediate their ends to lugs 58 projecting inwardly from the annular flange 30. This annular flange has openings 60 through which the power levers 52 are extended. The inner ends of the power levers 52 are provided with two parallel arms 62, see Figure 6, bored at 64 for the reception of bearings 66, see Figures 2 and 10, engaging the peripheral face of the cam 44. The lugs 58 fit between the arms 62 and are pivotally connected therewith through the medium of bearing pins 68.

Each of the cylinders is provided with a plurality of exhaust ports 70 to exhaust the gases to the atmosphere, with the reaction such as to impart clockwise rotation to the cylinder bank when viewed according to Figure 2. The cam 44 is eccentric in the degree necessary to permit pivotal movement of the power levers 52 from one extreme position of the piston to its other extreme position. The cam 44 of Figure 2 includes short peripheral extents 72 which are concentrically curved with respect to the axis of the shaft 12 so as to give the pistons dwell periods of short duration in their two extreme positions in their respective cylinders. In addition to the rocket reaction incident to exhausting gases, the pistons apply power to the levers 52 upon their power strokes so that the power levers 52 react on the eccentric cam 44 to impart rotary motion to the cylinder bank in a clockwise direction when viewed according to Figure 2.

Should a cylinder fail to fire, provision is made for moving that power lever 52 in conformity with the cam 44 on the intake stroke of the piston. This means comprises a flange 74 fixedly related to the cam 44 and provided with a groove 76 for the reception of pins 78 attached to the respective bearings 62. The groove 76 is to that portion of the cam 44 which moves the pistons downwardly in their respective cylinders.

In Figure 1, the cylinders 22 are provided with fuel injectors 80 in the heads thereof. The cylinders 24 are also provided with identical fuel injectors. In Figure 1, the fuel injectors include plungers 82 engaged by arms 84 pivotally connected at 86 intermediate their ends with lugs 88 projecting inwardly from the annular flange 30. The inner ends of the arms 84 are provided with bearings 90 engaging the peripheral face of a cam 92 fixedly related to the cam 44.

Since the cam 92 is stationary, rotation of the engine will cause actuation of the arms 84 to operate the fuel injectors 82.

Fuel is supplied to the injectors 82 through pipes 94, see Figure 2, communicating with a chamber 96 in the body 34, see Figure 3. The sleeve 42 is provided with a passage 98 having communication with the chamber 96 and extending longitudinally through the sleeve for connection with a fuel feeding means (not shown), which may be mounted on the extension 40. The body 34 may also be provided with a chamber 100 for a lubricant to be delivered to the cylinders and other working parts of the engine by suitable means (not shown). The chamber 100 has communication with a passage 102 in the sleeve 42 for connection with a source of lubricant in the same manner as the passage 98.

Scavenger lips 104 are provided on the cylinders 22 and 24, which lips are curved in the direction of rotation of the engine and are arranged to deflect air inwardly of the cylinders for scavenging purposes.

Figures 8 and 9 illustrate the construction of the slides 56. Each slide comprises two curved plates 106 fixedly secured one to the other by bars 108 fitting in recesses 110 in the bars 106 and secured to the bars by bolts 112. The outer edges of the bars 106 have grooves 114 slidably engaging the edges 116 of their respective cylinders, the cylinders being cut out at 118 to accommodate their respective slides, see Figure 4. Each cylinder is provided with an end plate 120 fitting against the flange 122 at the end of the cylinder and secured thereto by channel clamps 124 bolted into a unitary structure, as at 126 in Figure 5. The plates 120 are provided with openings 128 for the movement of air incident to piston travel.

Without further elaboration, the foregoing will so fully illustrate my invention, that others may, by applying current knowledge, readily adapt the same for use under various conditions of service.

I claim:

In an internal combustion engine, a shaft, a hollow body rotatable about said shaft, cylinders carried by said body externally thereof at its periphery and extending circumferentially of the body in spaced relation to each other, a cam carried by said shaft within said body, pistons in said cylinders slidable longitudinally in forward end portions thereof, said cylinders having longitudinal slots in their rear portions, said body being formed with circumferential slots in its periphery between the cylinders, plates slidable longitudinally in the slots of said cylinders and each formed with an opening, levers passing through the slots of the body and the openings of said plates and pivotally mounted in the body, said levers having their inner ends bifurcated to receive bearings adapted to contact said cam and their outer ends pivoted to said pistons, said levers being pivotally mounted intermediate their ends on said body.

GLENN J. WAYLAND.

REFERENCES CITED

The following references are of record in the file of this patent:

UNITED STATES PATENTS

| Number | Name | Date |
|---|---|---|
| 1,918,174 | Berggren | July 11, 1933 |
| 1,743,107 | Boillard | Jan. 14, 1930 |
| 915,828 | Cameron | Mar. 23, 1909 |
| 1,530,563 | King | Mar. 24, 1925 |
| 981,995 | Godlove | Jan. 17, 1911 |
| 877,977 | Axtell | Feb. 4, 1908 |
| 2,353,065 | Petrilli | July 4, 1944 |
| 1,644,564 | Bullington | Oct. 4, 1927 |